J. DICK.
FODDER CUTTER.
APPLICATION FILED FEB. 16, 1912.
1,046,449.
Patented Dec. 10, 1912.
2 SHEETS—SHEET 1.
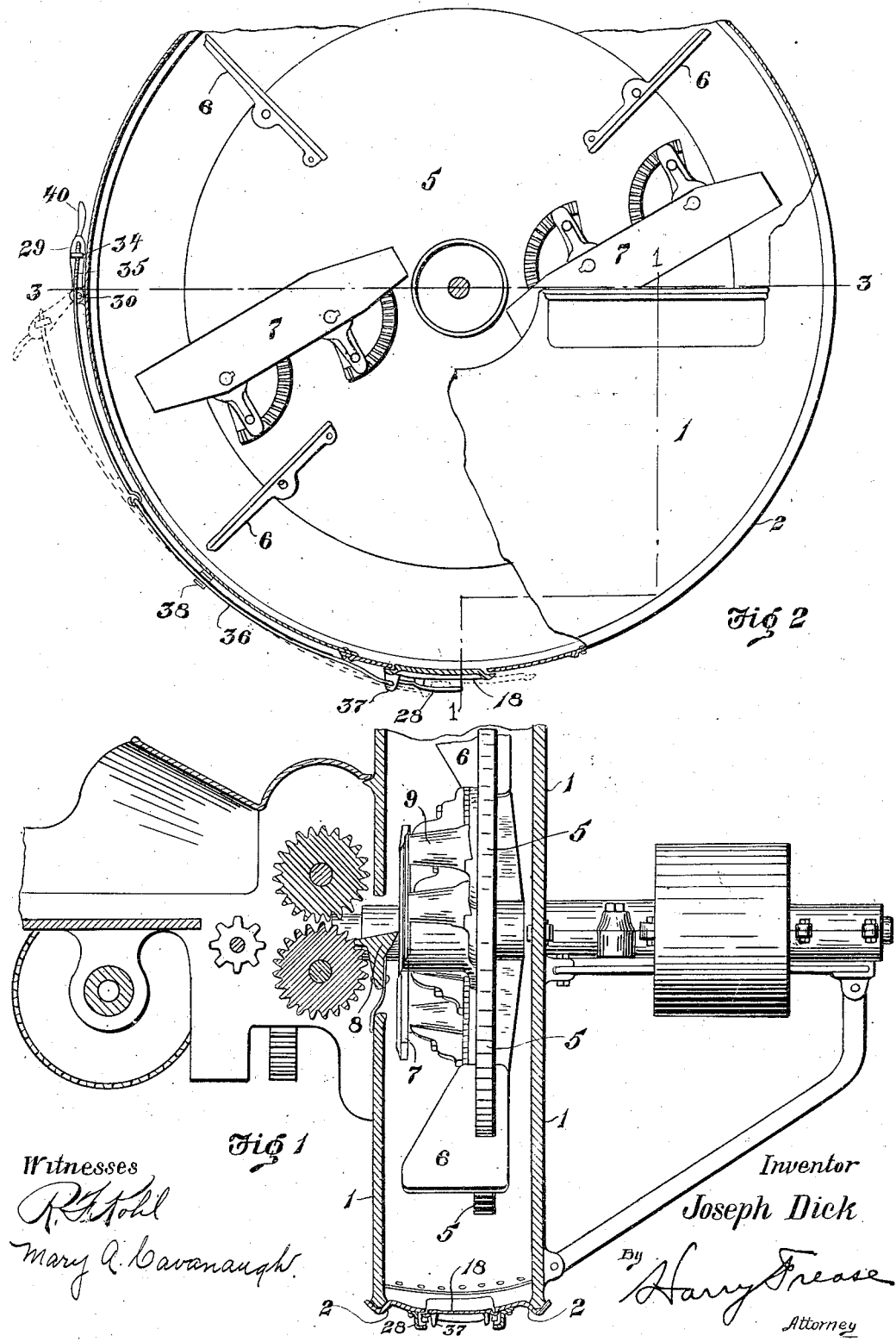
Witnesses
R. F. Kohl
Mary A. Cavanaugh
Inventor
Joseph Dick
By Harry Frease
Attorney

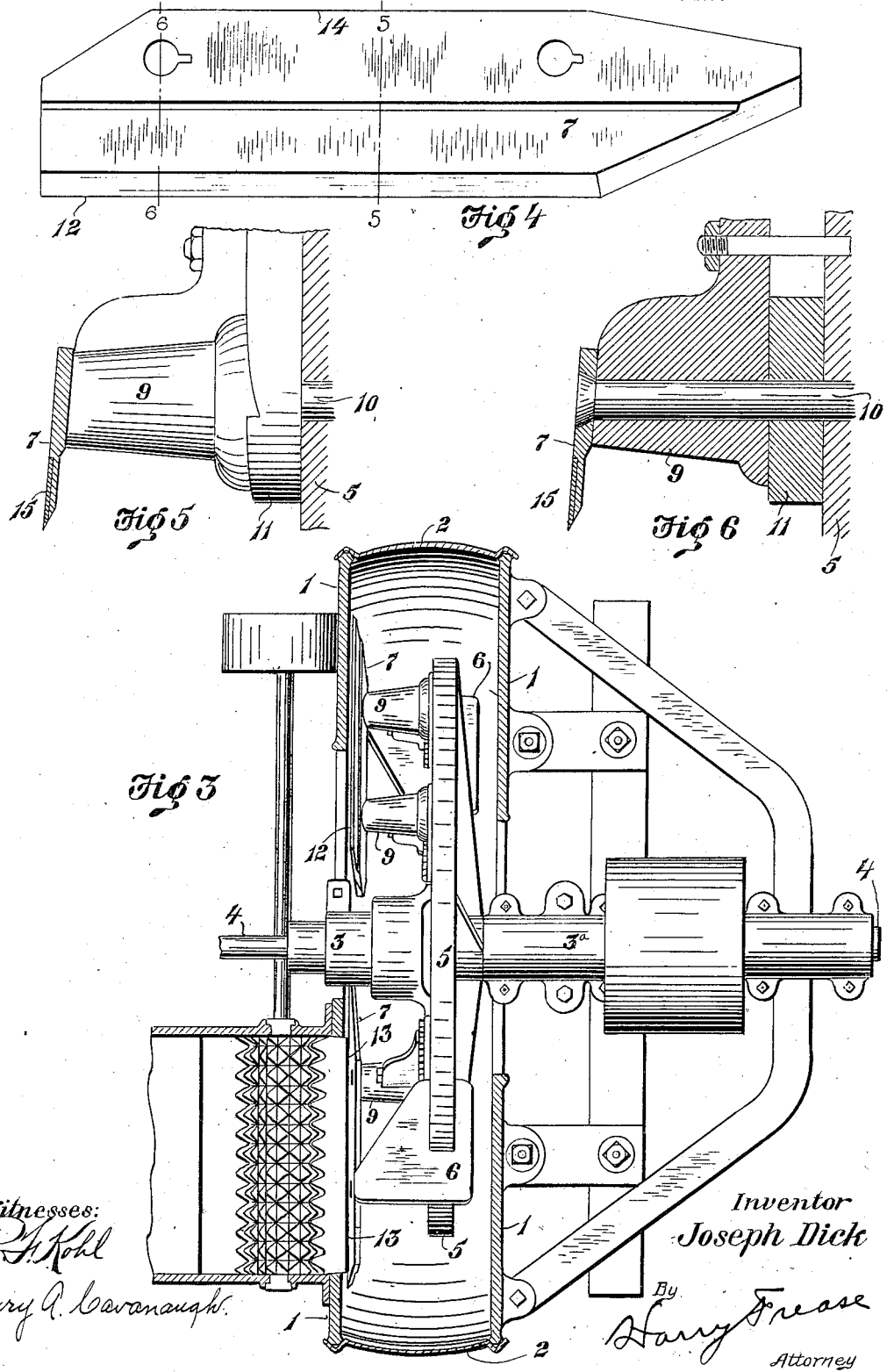

UNITED STATES PATENT OFFICE.

JOSEPH DICK, OF CANTON, OHIO.

FODDER-CUTTER.

1,046,449.  Specification of Letters Patent.  Patented Dec. 10, 1912.

Application filed February 16, 1912.  Serial No. 678,042.

*To all whom it may concern:*

Be it known that I, JOSEPH DICK, a citizen of the United States, residing at Canton, in the county of Stark and State of Ohio, have invented certain new and useful Improvements in Fodder-Cutters, of which the following is a specification.

The invention relates to machines for cutting fodder and other forage, as, for instance, corn stalks and the like, and to that particular type of machines in which the cutting knives and fan flights are secured on a wheel within a pneumatic blower case and in which the knives shear against the edge of a cutter bar secured in one side of the case; and the improvement pertains to the construction and shape of the cutting knives for better adapting them to the extraordinary shocks and shearing strains imposed upon them in this particular combination.

The purposes of the invention, thus set forth in general terms, are attained by the preferred embodiment thereof illustrated in the accompanying drawings, forming part hereof, in which—

Figure 1 is a fragmentary elevation section, substantially as on line 1—1, Fig. 2, of a fodder cutter, showing the general arrangement and location of the parts; Fig. 2, a fragmentary side elevation, mostly in section, of the blower case showing the outer flat side of the cutting knives; Fig. 3, a fragmentary plan section of the fodder cutter on line 3—3, Fig. 1, further illustrating the location and arrangement of the parts; Fig. 4, an inner side view of the cutting knife; Fig. 5, a section of the cutting knife on line 5—5, Fig. 4, showing a side view of the spacing post; and Fig. 6, a section of the cutting knife on line 6—6, Fig. 4, showing in section the securing bolt and the spacing post.

Similar numerals refer to similar parts throughout the drawings.

Well-known construction of this type of fodder cutters includes a blower case composed of circular side plates 1, clamped in spaced relation by the peripheral band 2 and carrying the bearings 3 and 3ª for the axial shaft 4 of the wheel 5 which carries the fan flights 6 and the cutting knives 7; in one side of which case is secured the stationary cutter bar 8.

The cutting knives 7 are spaced from and secured to the wheel 5 by means of the tubular posts 9 and the bolts 10, and the cam plates 11 are provided between the tubular posts and the wheel for adjusting the knives to and from the wheel, so that the cutting edge 12 of each knife will properly shear against the inner edge 13 of the cutter bar 8.

The outer ends of the spacing posts are slightly beveled and abut the inner sides of the cutting knives adjacent to the rear edge 14 thereof, and the preferred arrangement of these parts involves the use of two or more of such posts spaced apart and abutting the rear half only of the inner side of the cutting knife, thus leaving the forward half of the inner side of the cutting knife entirely free for cutting through a bunch of fodder, and providing the maximum amount of space between the knife and the wheel intermediate and outside the spacing posts for the passing of the cuttings.

An efficient operation of machines of this type for properly cutting the fodder by the knives and ejecting the cuttings from the case by the fan flights, requires the wheel to be rotated from eight to twelve hundred revolutions per minute. It is furthermore desirable, if not necessary, that the outer flat side of each cutting knife should be obliquely inclined from the rotating plane of its cutting edge, as by the beveled ends of the spacing posts, as well shown in Figs. 5 and 6, so that the cutting edge only will shear against the edge of the cutter bar; and, for the purpose of insuring a pressing contact between the edges of each cutting knife and the cutter bar for the most efficient shearing action, it is practically desirable, if not necessary, to so adjust each cutting knife that the cutting edge thereof will be slightly deflected by a flexion of the adjacent portion of the knife, when shearing against the cutter bar, thus requiring a slight lateral elasticity in this portion of the knife. Without such elasticity, it is difficult, if not impossible, to properly adjust the knives without having their cutting edges nicked or turned by contact with the cutter bar.

On the other hand, the severe shocks and the twisting and lateral strains imposed upon the knife by cutting through a bunch of fodder with a pressing shearing action against the cutter bar, and the fact that the blade is obliquely supported at spaced points on the rear portion of only one side, render it practically desirable, if not necessary, that this portion of the blade should be rigid and inflexible to properly hold the cutting edge to its work and to prevent a breaking of the knife by the extraordinary shocks and strains imposed upon it.

The same extraordinary shocks and strains, coupled with the centrifugal force developed by the rapid rotation, renders it necessary to make a knife of this character out of one piece of metal or the equivalent thereof; and accordingly it has been the practice to combine the greater strength of a softer metal with the enduring edge of a harder metal, by making the body of the knife out of wrought iron and inlaying the outer side along and adjacent to the cutting edge with a strip of steel as 15, the different metals being joined or welded together in the process of rolling the bars out of which the knives are made so as to form a substantially integral or one-piece structure.

The present invention involves the making or shaping of the forward portion of each knife of substantially uniform thickness but sufficiently thin to give the necessary or desirable lateral flexibility or elasticity required for the most efficient work, and to make or shape the rearward securing portion of the knife of sufficient thickness to give the necessary inflexibility or rigidity for holding the cutting edge to its work and preventing a breaking of the knife. For instance, it has been found that an ordinary size of cutting blades for fodder cutters of this type, having a length of about thirteen inches and a width of about three and one-fourth inches, should have a thickness of about two-tenths of an inch in that portion adjacent to the cutting edge, which may well be called the forward portion, and a thickness of about three-tenths of an inch in that half or portion adjacent to the back edge of the knife, which may well be called the securing portion, to give the elasticity in the forward portion and the rigidity in the securing portion of the knife which it is the object of the present invention to attain. Or more generally, the relative thickness of the forward portion and the rearward securing portion of the cutting knife, should be as two to three; although an increased relative thickness of the securing portion is negligible when the forward portion is thin enough to give the desired resilience for the purposes herein set forth. And it is evident that ancillary advantages arise from the peculiar shape of the knife, thus set forth, in that the thinner forward portion is enabled to cut through the thicker stalks or bunches of forage with a minimum spreading of the severed parts; and a saving is effected in sharpening the knife because of the minimum thickness of stock which is carried in the forward portion thereof.

I claim:

In a fodder cutter, a rotatable wheel, a stationary cutter bar secured at one side thereof, a cutting knife obliquely secured on the side of the wheel, the knife being made of one piece and having a flat outer side and a forward cutting edge, spacing posts between the wheel and the knife abutting the rear portion of the inner side of the knife, whereby the cutting edge thereof will shear against the bar, the forward cutting portion of the knife being made of substantially uniform thickness but thinner than the rearward securing portion thereof, to permit a pressing contact of the cutting edge against the cutter bar in the shearing action.

JOSEPH DICK.

Witnesses:
 RAY F. KOHL,
 RUTH A. MILLER.